(No Model.)

H. C. DEAN.
PNEUMATIC TIRE.

No. 560,196. Patented May 19, 1896.

WITNESSES:

INVENTOR
H. C. Dean
BY Munn &Co.
ATTORNEYS.

UNITED STATES PATENT OFFICE.

HARRY C. DEAN, OF LONG ISLAND CITY, NEW YORK.

PNEUMATIC TIRE.

SPECIFICATION forming part of Letters Patent No. 560,196, dated May 19, 1896.

Application filed October 31, 1895. Serial No. 567,551. (No model.)

*To all whom it may concern:*

Be it known that I, HARRY C. DEAN, of Long Island City, (Astoria,) in the county of Queens and State of New York, have invented a new and Improved Pneumatic Tire, of which the following is a full, clear, and exact description.

This invention relates to certain improvements in pneumatic tires, such as are employed for the wheels of bicycles and other vehicles; and the object of the invention is to provide a tire of a light, simple, and inexpensive construction which shall be substantially puncture-proof.

The invention consists in a tire which may be either of the "inner-tube" or "single-tube" style, having its tread provided with an annular shield comprising a series of plates of hard material, said plates being each provided with elongated or slotted openings and rivets, the rivets of one plate working in the slots of an adjacent plate, said shield being arranged inside the outer sheathing or cover of the tire, so as to be protected as much as possible from wear, and serving to protect the inner portions of the tire against being punctured by glass, nails, or the like.

The invention also contemplates certain novel features of the construction, combination, and arrangement of the various parts of the improved tire, whereby the device is made simpler, cheaper, and more durable, and is otherwise more convenient and better adapted for use than various other devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1:
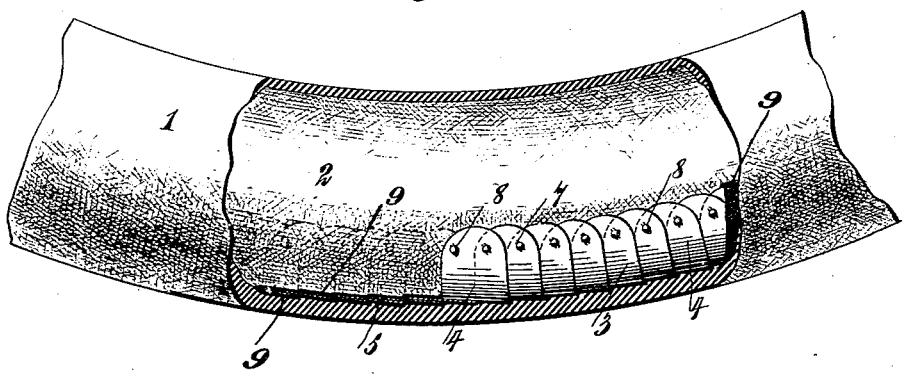
Figure 2:
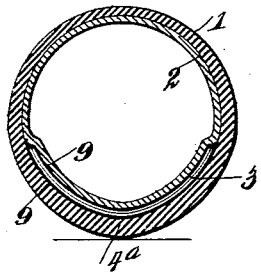
Figure 3:
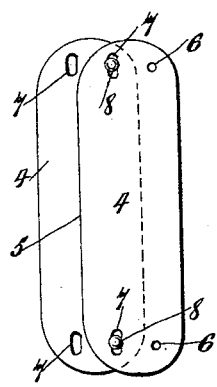
Figure 4:
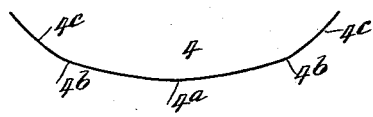
Figure 5:
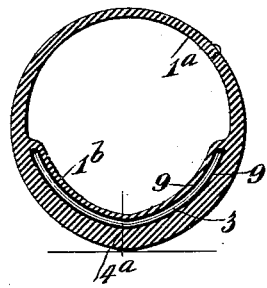

Figure 1 is a view showing in side elevation a fragment of a tire constructed according to my invention, the central portion of the tire being broken out and shown in section to illustrate the construction and arrangement of the interior shield; and Fig. 2 is a transverse section taken through the tire, these two views showing the device applied to an inner-tube tire. Fig. 3 is a face view showing two of the plates of which the shield is formed. Fig. 4 is an edge view of one of said plates; and Fig. 5 is a view somewhat similar to Fig. 2, but showing the shield applied to a single-tube tire.

Referring primarily to Figs. 1 to 4, 1 represents the outer tube or cover, and 2 the inflatable inner tube of the tire, said tubes being independent of each other, as is usual in inner-tube tires, and 3 represents, as a whole, the improved guard or shield of annular form arranged between the inner and outer tubes 2 and 1 at the tread of the tire.

The guard or shield 3 is, as shown in the drawings, composed of a series of thin plates 4, formed by preference of spring-steel or other sufficiently elastic and strong material having smooth surfaces, each plate 4 being of a general elongated form, as shown in Fig. 3, and having rounded end portions. The plates or sheets 4 are so secured together, by means to be hereinafter referred to, as to overlap each other, as indicated at 5 in the drawings, so that it will be seen that the guard or shield is in reality composed of two thicknesses of metal plates or is made of double the thickness of the metal forming the plates 4.

Each plate or section 4 of the guard or shield 3 has at opposite ends at one side a circular perforation 6 and at similar points on its other side elongated or slotted openings 7 of curved form, as herein shown, being concentric with the circular openings 6 at the opposite sides of the plate, and in said circular openings 6 in each plate are set rivets 8, extending through and working in the slots 7 of adjacent plates 4, said rivets serving to hold the plates together, while permitting a certain degree of movement of the plates on one another.

Each of the plates 4 is bent at its central portion, as seen at $4^a$ in Fig. 4, so as to form a bead or projection extending centrally around the shield or guard, and arranged to stand normally at the tread of the tire, as indicated in Fig. 4, so that the said tread is made narrower, as will be readily understood, and the extremities $4^c$ of said plates 4 are bent at $4^b$, as seen in Fig. 4, so that they will play freely over one another when the tire is in use.

In order to prevent the shield or guard 3 from wearing or chafing against the inner and outer tubes 2 and 1 of the tire when in place or from damaging said tubes by corrosion in case it should become wet or rusted, I prefer to provide a cover or envelop 9 for said shield or guard, which cover may be conveniently formed of canvas or other suitable fabric.

In applying the device to a single-tube tire some change will be necessary, as will be evident, and I prefer to employ the construction shown in Fig. 5, wherein the single-tube tire 1ª is provided with an internal flap or diaphragm 1ᵇ, between which and the tread of the tire the shield 3 is held.

In use the shield or guard effectually prevents the tire from being punctured by any ordinary obstruction on the road, since should a nail or sharp fragment penetrate the outer covering at the tread of the wheel it will be turned aside by the smooth convex faces of the plates 4 and prevented from puncturing the inner thicknesses of the tire.

The device constructed as above described is extremely simple and inexpensive and is adapted for use in tires of any diameter, since the slotted connections between the plates or sections 4 enable the guard to accommodate itself to different positions. Moreover, said plates or sections being movable, nails or other sharp objects are prevented from passing through the plates in case such objects strike the plates exactly at the center, for in such cases the plates will move so as to cause the nails to slide up one or the other of the sides of the guard.

From the above description it will be obvious that the device is susceptible of considerable modification without material departure from the principles and spirit of the invention, and for this reason I do not wish to be understood as limiting myself to the exact form of the improved guard or shield herein set forth.

Having thus described my invention, I claim as new and desire to secure by Letters Patent—

1. A guard or shield for pneumatic tires, formed of a series of plates or sheets each having at opposite ends slots and rivets, the rivets of one plate working in the slots of an adjacent plate, substantially as set forth.

2. A guard or shield for pneumatic tires, formed of a series of plates or sheets of spring metal, each having at opposite ends inclined slots and rivets, the rivets of one plate working in the slots of an adjacent plate, substantially as set forth, 3. A guard or shield for pneumatic tires, formed of a series of plates or sheets of spring metal, each having at opposite ends inclined slots and rivets, the rivets of one plate working in the slots of an adjacent plate, said plates having transverse bends formed in them and fitting together to form a projecting central bead extending around the tread of the tire, substantially as set forth.

HARRY C. DEAN.

Witnesses:
J. D. CAPLINGER,
JNO. M. RITTER.